Aug. 3, 1948.　　　　A. Y. DODGE　　　　2,446,462
TRANSMISSION
Filed July 28, 1945
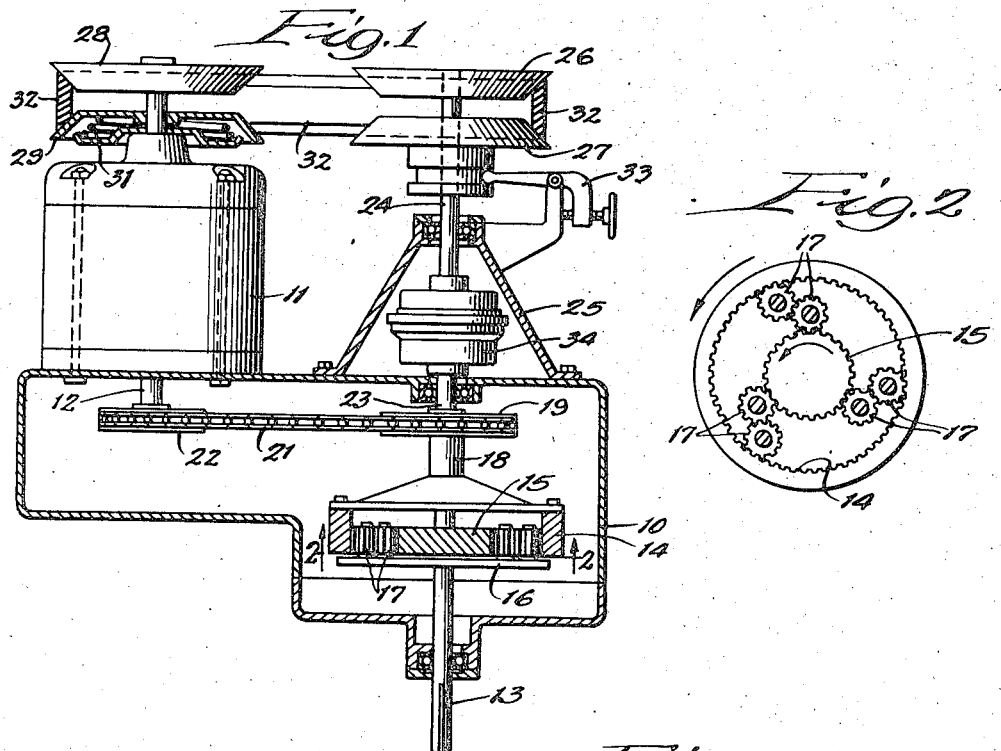
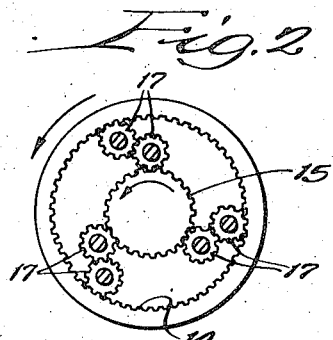
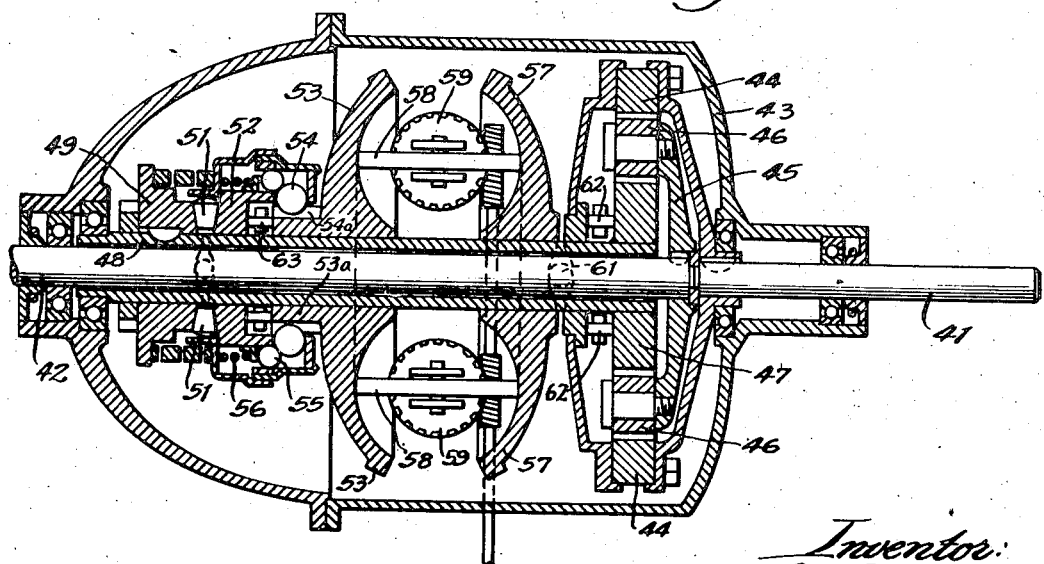
Inventor:
Adiel Y. Dodge,
By Lawson, Toms & Booth
Attorney.

Patented Aug. 3, 1948

2,446,462

UNITED STATES PATENT OFFICE 2,446,462

TRANSMISSION

Adiel Y. Dodge, Rockford, Ill.

Application July 28, 1945, Serial No. 607,607

8 Claims. (Cl. 74—286)

This invention relates to transmissions and more particularly to infinitely variable torque transmitting units for connecting driving and driven shafts.

It is one of the objects of the invention to provide a transmission variable over a wide range of speed and torque ratios through an infinite number of steps. According to one feature, the driving and driven shafts turn in the same direction without requiring excessively high pitch velocities in the gearing or other transmission elements employed.

Another object is to provide a transmission of the regenerative type in which the torque load in the regenerative path is limited to prevent damage to the parts.

Still another object is to provide a regenerative type transmission in which the torque and speed ratios are varied by a friction type infinitely variable torque transmitting device.

A further object is to provide a transmission in which a variable V-belt drive mechanism is employed to vary the transmission ratio. In one preferred construction, the V-belt mechanism is mounted in a relatively exposed position so that easy access may be had thereto for changing or adjusting the belts.

The above and other objects and advantages of the invention will be more readily apparent from the following detailed description when read in connection with the accompanying drawing in which—

Figure 1 is a plan view with parts in section of a transmission unit embodying the invention;

Figure 2 is a partial section on the line 2—2 of Figure 1; and

Figure 3 is an axial section of an alternative construction.

The transmission of Figure 1 comprises a housing or casing 10 which may conveniently provide a supporting framework for the transmission unit and which may, if desired, be filled with lubricant to lubricate the transmission parts enclosed therein. On the exterior of the casing 10 an electric motor 11 is supported with its driving shaft 12 projecting beyond its opposite ends. As shown one end of the driving shaft 12 may extend within the housing 10 while the opposite end is exposed at the outer end of the motor casing.

The unit is adapted to drive a driven shaft 13 projecting beyond the casing and lying parallel to but spaced from the motor shaft 12. The driven shaft 13 is connected to one element of a differential gear set which is enclosed within the casing 10 and which, as shown, comprises a ring gear element 14, a sun gear element 15, a planet carrier element 16 connected to the shaft 13 and carrying planet pinions 17 which mesh with the sun and ring gears. As best seen in Figure 2, the planet pinions 17 are double so that the sun and ring gears will tend to rotate in the same direction when resistance is imposed on the driven shaft and the carrier.

The ring gear 17 is connected to a sleeve 18 coaxial with the driven shaft and which carries a sprocket 19. A sprocket chain 21 connects the sprocket 19 to a similar sprocket 22 on the motor shaft 12. It will be noted that the entire gear and sprocket units lie within the casing 10 so that they may be adequately lubricated by lubricant carried in the casing.

The sun gear 15 is connected to a shaft 23 extending out of the casing 10. An extension 24 of the shaft 23 projects through a supplemental casing part 25 to a position substantially in alignment with the outer end of the motor shaft 12.

The motor shaft and the shaft extension 24 are connected through a variable torque transmitting device shown as a V-belt drive mechanism. This mechanism includes a V-pulley part 26 rigidly secured to the shaft 24 and a complementary pulley part 27 slidable axially on the shaft 24. The motor shaft 12 carries a similar fixed pulley part 28 and a movable pulley part 29 urged toward the part 28 by a spring 31. A conventional V-belt 32 connects the two pulleys and the driving ratio of the pulleys may be adjusted through a manually adjustable lever 33 connected to the movable pulley part 27. As will be apparent when the pulley parts 26 and 27 are moved relative to each other, a corresponding movement of the parts 28 and 29 will occur through extension or compression of the spring 31 so that the driving ratio between the shafts 24 and 12 will be varied.

In normal operation of the device, assuming that the motor shaft 12 is turning counterclockwise as viewed from the bottom, the ring gear 14 will be driven counterclockwise through the sprocket mechanism. Torque reactance on the driven shaft 13 tending to hold the carrier 16 stationary causes the sun gear 15 to be driven counterclockwise through the planet pinions. This drive is transmitted through the shafts 23 and 24 and the V-belt mechanism to the motor shaft 12, increasing the torque thereon so that a greater torque output than that developed by the motor is available at the driven shaft. It will be apparent that by adjusting the V-belt mechanism, the overall torque ratio of the unit can be varied throughout a wide range and that due to the gear arrangement relatively low pitch velocities in the gear unit and in the V-belt drive unit are required. It will also be seen that since the V-belt drive mechanism is exposed at the outer portion of the transmission unit, it is readily available for inspection, adjustment or replacement of worn belts.

In a regenerative drive of the type described the torque values existing in the regenerative torque path tend to become extremely high and may become great enough to damage the transmission parts or parts of the driven mechanism. In order to limit such torque values an overload release coupling 34 is provided in the housing extension 25 connecting the shaft 23 to the shaft extension 24. This coupling may take the form of that shown in my Patent No. 2,238,583 or in my Patent No. 2,429,091 issued October 14, 1947. With such a coupling when the torque transmitted therethrough exceeds a predetermined value, the shaft portions 23 and 24 will be disconnected and will not be reconnected until the unit is stopped or until the torque drops to a substantially lower value. As soon as the coupling is disconnected, the sun gear 15 can rotate freely so that no torque will be transmitted to the output shaft 13.

It is preferable to arrange the overload release coupling in the regenerative torque path, to form a self contained unit, since this path may transmit the maximum power of any of the transmission shafts. Control of the torque in the regenerative path, therefore, provides overall sensitivity and accuracy and, in addition, insures that the maximum torque carried by any of the transmission parts can never reach an excessive value. Therefore, with the present invention the several transmission parts, as well as the mechanism to be driven, are fully protected against overloads.

In the construction shown in Figure 3, a driving shaft 41 which may be connected to a motor or the like is adapted to drive a driven shaft 42 which may be connected to any desired mechanism to be driven. The driving and driven shafts project into a housing 43 which encloses the entire transmission mechanism. Within the housing, a planetary differential gear set is provided including a ring gear element 44 connected to a driving shaft 41, a planet carrier element 45 connected to the driven shaft 42 and carrying a single set of planet pinions 46 which mesh with the ring gear element and with a sun gear element 47. The sun gear is mounted on a sleeve 48 which is rotatable around the driven shaft 42. The sleeve 48 is connected to a driving block member 49 formed with end cam surfaces which engage one or more rollers 51. The rollers 51 similarly engage end cam surfaces on a driven sleeve 52, the arrangement being such that the sleeve 48 will drive the sleeve 52 through the cam mechanism and will exert an axial thrust on the sleeve 52 which is proportional to the torque load thereon. The sleeve 52 is adapted to be connected to the driving member 53 of a friction toroidal transmission through an overload release coupling which is illustrated as being of the type more particularly described and claimed in my said Patent No. 2,429,091. As shown, the coupling comprises a plurality of balls 54 slidable in radial slots formed in the sleeve 52 and urged inwardly by balls 55 slidable in axial slots in the sleeve and urged toward the balls 54 by a spring 56. The balls 54 are adapted to engage peripheral notches 54a in a hub 53a on the transmission member 53 so that when the balls are moved inward, as shown, the sleeve 52 and the transmission member 53 will be connected. Upon an excess of torque the balls 54 will be cammed outwardly, thereby moving the balls 55 to the left against the spring 56 to release the transmission member 53, the torque required to hold the balls in the outward position in these conditions being relatively light due to the fact that the point of engagement between the balls 54 and 55 changes so that the spring acting through the balls 55 is relatively ineffective to urge the balls 54 inward.

The transmission unit is completed by a second annular transmission member 57 having a toroidal inner surface facing a similar surface on the member 53. A plurality of rollers 58 engage the toroidal surfaces of the members 53 and 57 drivably to connect them. The angle of the rollers may be adjusted through worm and worm gear mechanism 59. By adjusting the angle of the rollers through the gear mechanism, the driving ratio between the transmission members 53 and 57 can be changed throughout a wide range as will be understood.

The member 57 is connected to the ring gear 44 through a cam and roller mechanism including cam rollers 61 engaging end cam surfaces on the member 57 and on an extension of the ring gear. This mechanism is similar to that including the rollers 51 and provides an axial thrust on the transmission member 57 proportional to the torque load. It will be seen that all of the variable speed transmission parts which are subject to opposing thrusts are supported on the sleeve 48 so that the entire thrust load may be absorbed by this sleeve. As shown, the sun gear 47 on one end of the sleeve is connected to the extension of the ring gear through thrust bearings 62 and similar thrust bearings 63 are provided between the sleeve 52 and the transmission member 53. Therefore, all of the thrust generated by the cam mechanisms 51 and 61 for urging the transmission parts 53 and 57 into engagement with the rollers 58 is carried by the sleeve 48 so that no external thrust bearings are required.

In operation of this unit, assuming that the shaft 41 drives the ring gear 44 clockwise as viewed from the right in Figure 3, the sun gear 47 will tend to rotate counterclockwise and to drive the transmission member 53 counterclockwise through the overload release device and the cam mechanism 51. This rotation will be reversed through the rollers 58 so that the transmission member 57 will again be driven clockwise and will tend to turn the ring gear clockwise. Thus the torque developed in the variable torque path is added to that of the driving shaft on the ring gear so that a high output torque on the shaft 42 can be developed. Damage to the transmission parts due to overload will be prevented by the overload release device 54 which is arranged in the regenerative path to limit the torque transmitted therethrough.

While two embodiments of the invention have been shown and described in detail it will be understood that these are illustrative only and are not to be taken as a definition of the scope of the invention, reference being had for this purpose to the appended claims.

What is claimed is:

1. A transmission comprising a differential gear set including three relatively rotatable elements, driving means connected to one of the elements to drive it, means to be driven connected to another of the elements, and means including a variable torque transmission device and an overload release coupling connecting the third of the elements to said one of the elements, the gear set and transmission device being so constructed and arranged that the third element tends to drive said one of the elements in the same direction in which it is driven by the driving means.

2. A transmission comprising a differential gear set including three relatively rotatable elements, driving means connected to one of the elements to drive it, means to be driven connected to another of the elements, a variable speed and torque transmission device, means connecting said device to said one of the elements and to a third element of the gear set so arranged that the third element tends to drive said one element in the same direction in which it is driven by the driving means, and an overload release coupling in the connecting means adapted to interrupt the transmission of torque in response to a predetermined torque in the connecting means.

3. A transmission comprising a differential gear set including three relatively rotatable elements, driving means connected to one of the elements to drive it, means to be driven connected to another of the elements, a friction type mechanical torque transmission device, means to vary the torque and speed transmission ratios of said device, means connecting said device to said one of the elements and to a third element of the gear set so arranged that the third element tends to drive said one element in the same direction in which it is driven by the driving means, and a torque responsive coupling in the connecting means adapted to interrupt the connection in response to a predetermined torque.

4. A transmission comprising a planetary differential gear set including a sun gear, a ring gear, a planet carrier, and pinions on the carrier connecting the sun and ring gears, driving means connected to the ring gear, driven means connected to the carrier, and connecting means connecting the sun gear to the ring gear so constructed and arranged that the sun gear tends to drive the ring gear in the direction in which it is driven by the driving means, the connecting means including a variable torque transmission device and an overload release coupling adapted to interrupt the transmission when the torque in the coupling means exceeds a predetermined value.

5. A transmission comprising a differential gear set including three relatively rotatable elements, driving means connected to one of the elements, means to be driven connected to another of the elements, a variable V-pulley connected to the driving means, a second variable V-pulley, means including an overload release couping connecting the second pulley to a third element of the gear set, a belt connecting the pulleys, and means to adjust the pulleys to vary the torque transmission ratio therebetween.

6. A transmission for connecting parallel offset driving and driven shafts comprising a differential gear set coaxial with the driven shaft and including three coaxial rotatable elements, one of which is connected to the driven shaft, means connecting the driving shaft to another element of the gear set, variable V-pulleys on the driving shaft and connected to a third element of the gear set, a belt connecting the pulleys, means to adjust the pulleys to vary the transmission ratio therebetween and an overload release coupling between the third element of the gear set and the pulley connected thereto adapted to interrupt the connection in response to a predetermined torque.

7. A transmission for connecting parallel offset driving and driven shafts comprising a planetary differential gear set including ring and sun gears coaxial with the driven shaft and a carrier carrying planet pinions meshing with the gears, the carrier being connected to the driven shaft, means including a sleeve coaxial with the driven shaft connecting the driving shaft with the ring gear, a shaft extending through the sleeve connected to the sun gear, variable V-pulleys on the last named shaft and the driving shaft, a belt connecting the pulleys, means to adjust the pulleys to vary the driving ratio therebetween and an overload release coupling in the last named shaft adapted to release in response to a predetermined torque.

8. A transmission comprising a motor having a driving shaft projecting from its opposite ends, a planetary differential gear set including a sun gear, a ring gear, a planet carrier, and pinions on the carrier connecting the sun and ring gears, means connecting one end of the motor shaft to the ring gear, means to be driven connected to the carrier, a shaft connected to the sun gear lying parallel to and spaced from the motor shaft, an overload release coupling connected in the last named shaft adapted to release in response to a predetermined torque, variable V-pulleys on the last named shaft and the other end of the motor shaft, a belt connecting the pulleys, and means to adjust the pulleys to vary the driving ratio therebetween.

ADIEL Y. DODGE.

REFERENCES CITED

The following references are of record in the file of this patent:

UNITED STATES PATENTS

| Number | Name | Date |
|---|---|---|
| 436,970 | Edison | Sept. 23, 1890 |
| 2,164,504 | Dodge | July 4, 1939 |
| 2,179,933 | Heyer | Nov. 14, 1939 |
| 2,330,397 | Trofimov | Sept. 28, 1943 |